(12) United States Patent
Yildiz et al.

(10) Patent No.: US 10,504,289 B2
(45) Date of Patent: Dec. 10, 2019

(54) METHOD AND APPARATUS FOR SECURELY DISPLAYING PRIVATE INFORMATION USING AN AUGMENTED REALITY HEADSET

(71) Applicant: Dell Products, LP, Round Rock, TX (US)

(72) Inventors: Yagiz C. Yildiz, Austin, TX (US); Jace W. Files, Round Rock, TX (US); Abu S. Sanaullah, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 35 days.

(21) Appl. No.: 15/968,518

(22) Filed: May 1, 2018

(65) Prior Publication Data

US 2019/0340815 A1 Nov. 7, 2019

(51) Int. Cl.
*G06T 19/00* (2011.01)
*G06T 7/73* (2017.01)
(Continued)

(52) U.S. Cl.
CPC ........ *G06T 19/006* (2013.01); *G02B 27/0172* (2013.01); *G06T 1/0021* (2013.01); *G06T 7/74* (2017.01); *G09G 5/12* (2013.01); *H04N 1/32144* (2013.01); *G02B 2027/014* (2013.01); *G02B 2027/0134* (2013.01); *G02B 2027/0138* (2013.01); *G02B 2027/0141* (2013.01);
(Continued)

(58) Field of Classification Search
CPC ....... G06T 19/006; G06T 1/0021; G06T 7/74; G06T 2207/10012; G02B 27/0172; G02B 2027/0141; G02B 2027/014; G02B 2027/0138; G02B 2027/0134; G09G 5/12; G09G 2340/12; G09G 2358/00; H04N 13/204
See application file for complete search history.

(56) References Cited

U.S. PATENT DOCUMENTS 6,559,813 B1   5/2003 DeLuca
6,765,550 B2   7/2004 Janick
(Continued)

*Primary Examiner* — Maurice L. McDowell, Jr.
(74) *Attorney, Agent, or Firm* — Prol Intellectual Property Law, PLLC; H. Kenneth Prol

(57) ABSTRACT

An information handling system operating an augmented reality assisted display security system may comprise a head mounted display device, a three-dimensional camera co-located with the head mounted display device capturing a three-dimensional image of a host display device displaying digital content, and a processor executing code instructions to determine a position and orientation of the head mounted display device with respect to a placeholder displayed by the host display device based on the three-dimensional image, generate a three-dimensional primitive of the head mounted display device and the placeholder based on the determined position and orientation, receive secure content, and render a three-dimensional image of the secure content within the placeholder primitive. The head mounted display device may display the three-dimensional image of secure content according to the three-dimensional primitive such that the rendered three-dimensional image of the secure content appears within the placeholder displayed on the host display device.

20 Claims, 8 Drawing Sheets

(51) Int. Cl.
  *H04N 1/32*    (2006.01)
  *G06T 1/00*    (2006.01)
  *G09G 5/12*    (2006.01)
  *G02B 27/01*   (2006.01)
  *H04N 13/204*  (2018.01)

(52) U.S. Cl.
  CPC .............. *G06T 2207/10012* (2013.01); *G09G 2340/12* (2013.01); *G09G 2358/00* (2013.01); *H04N 13/204* (2018.05)

(56) References Cited

U.S. PATENT DOCUMENTS

| | | |
|---|---|---|
| 7,779,475 B2 | 8/2010 | Jakobson |
| 8,502,780 B1* | 8/2013 | Park .................... G06F 3/04886 345/165 |
| 8,576,276 B2 | 11/2013 | Bar-Zeev |
| 2010/0079356 A1 | 4/2010 | Hoellwarth |
| 2012/0062702 A1 | 3/2012 | Jiang |
| 2013/0044128 A1 | 2/2013 | Liu |
| 2013/0278635 A1 | 10/2013 | Maggiore |
| 2013/0307870 A1* | 11/2013 | Ashbrook ............... G06F 21/84 345/629 |
| 2013/0335301 A1 | 12/2013 | Wong |
| 2014/0071288 A1 | 3/2014 | Kim |
| 2014/0232747 A1 | 8/2014 | Sugimoto |
| 2014/0253412 A1* | 9/2014 | Blaich ................... G06F 3/1454 345/1.2 |
| 2014/0306866 A1 | 10/2014 | Miller |
| 2015/0062158 A1* | 3/2015 | Hildreth ............. G02B 27/0172 345/633 |
| 2016/0147492 A1* | 5/2016 | Fugate .................. G06F 3/1423 345/633 |
| 2016/0196694 A1 | 7/2016 | Lindeman |
| 2017/0076502 A1 | 3/2017 | Chen |
| 2017/0104766 A1* | 4/2017 | Bhardwaj ............. H04L 63/126 |
| 2018/0107839 A1* | 4/2018 | Clement ............. G06F 21/6245 |

* cited by examiner

METHOD AND APPARATUS FOR SECURELY DISPLAYING PRIVATE INFORMATION USING AN AUGMENTED REALITY HEADSET

FIELD OF THE DISCLOSURE

The present disclosure generally relates to head mounted displays for information handling systems. The present disclosure more specifically relates to the secure display of private and confidential information via a head mounted display device in an augmented user interface.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a head mounted user interface and/or display.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
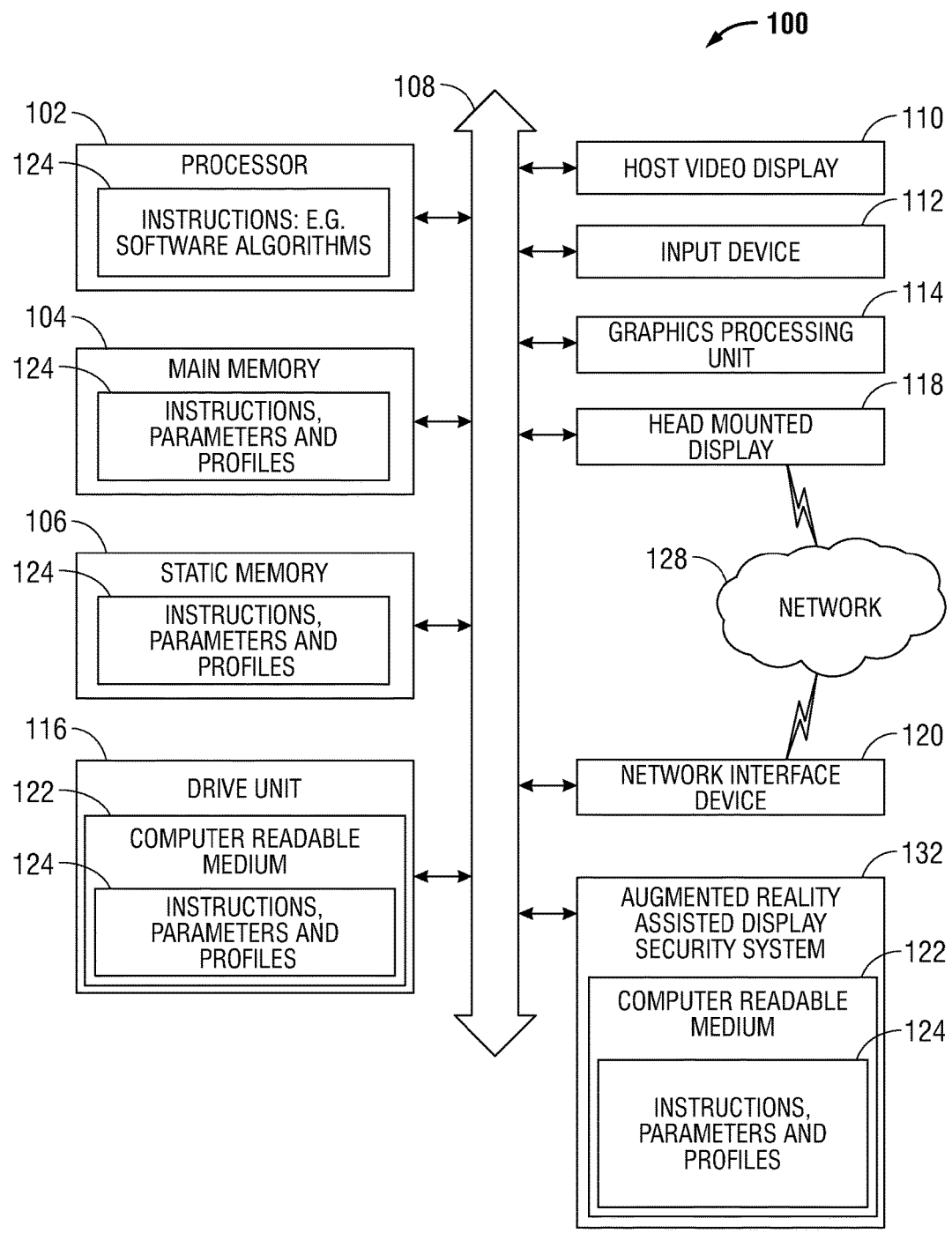
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Data security is critical for most businesses and even home computer users. Confidential and/or private information such as client information, payment information, personal files, and bank account details can be potentially dangerous if it falls into the wrong hands. Viewing such sensitive information on a computer screen in public may allow nearby strangers to view the information without the user knowing. Current solutions to this problem include limiting the allowable viewing angle of data on the screen, but these solutions still allow for others within the viewing angle to see the sensitive content. Additionally some of these solutions, such as use of a privacy screen, may cause distortions of the displayed image. A solution that does not distort the image and makes the data viewable by only the authorized user is needed.

The augmented reality assisted display security system may address this issue in embodiments of the present disclosure by displaying such sensitive information via a head mounted display within a head mounted display device wearable by the user working in conjunction with a host video display to create an augmented display system. Head mounted display devices, wearable around the user's head and/or eyes and including head mounted displays having the capability of reflecting projected images as well as allowing the user to see through it may be used with augmented or virtual reality display systems. A user may see through a head mounted display to view a host computing device with a separate host video display and user interface. A host computing device may include, but may not be limited to, any information handling system displaying images and data as described herein and may include a desktop personal computer, a laptop computer, a tablet computer, or a mobile phone. Viewing the host computing device through the head mounted display while the head mounted display also reflects projected images may generate a multiple device augmented user interface surface that appears to the wearer of the head mounted display device to be a single user interface.

In embodiments of the present disclosure, the augmented reality assisted display security system may operate to identify sensitive data, and to display such sensitive data via the head mounted display, rather than the host computer, such that only the wearer of the head mounted display device may view it. Such sensitive data may include, but may not be limited to certain types of files (e.g. financial documents), images, passwords, or even subsets of information given within a larger file or document (e.g. a slide describing financial information within a larger PowerPoint presentation that is otherwise non-sensitive). Further, the augmented reality assisted display security system in embodiments may display the sensitive data such that it appears to be displayed by the host video display. In order to do so, the augmented reality assisted display security system in embodiments may identify a command given to the host computer to display the sensitive information, deduct the sensitive information from the remaining content, instruct the host video display to display only the remaining content, and instruct the host video display to display a placeholder where the sensitive information would have been displayed. The augmented reality assisted display security system in embodiments of the present disclosure may then instruct the head mounted display to reflect the sensitive information onto the placeholder of the host video display, such that only the person wearing the head mounted display may view it, and such that the sensitive information appears to be displayed on the host video display.

In order to generate a multiple device augmented user interface surface, the head mounted display may reflect the projected images in such a way that they do not compromise the user's ability to see and/or manipulate the host computing device. The multiple device augmented surface management system or method may involve generation of three-dimensional maps or primitives that provide three-dimensional location data for objects seen through the head mounted display, including but not limited to, the host computing device, and particular types of data or images displayed by the host video display, including but not limited to placeholders, and watermarks. Such three-dimensional maps may enable the reflection of sensitive information through the head mounted display onto the host computing host video display such that the host video display, as seen from the wearer of the head mounted display, appears to be displaying the sensitive information, but the host video display, as seen from the perspective of all others, does not appear to display the sensitive information. In such a way, the augmented reality assisted display security system in embodiments of the present disclosure may make sensitive data viewable by only the authorized user and wearer of the head mounted display device, without distorting the images displayed by the host video display.

In one embodiment, the augmented reality assisted display security system is software code executable on one or more application processors, which may reside at the host computing device, at the head mounted display device, at one or more remote servers and data base systems or may reside across a combination of any of these locations. In other embodiments, some or all of the multiple device augmented surface management system may include firmware executed via processors or controller or may be hard-coded as an applied specific integrated circuit (ASIC) or other circuit to execute some or all of the operations described in the disclosure herein.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU) 114, hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses 108 operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the augmented reality assisted display security system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a host video display 110. The host video display 110 in an embodiment may function as a liquid crystal display (LCD), an organic light emitting diode (OLED), a flat panel display, a solid state display, or a cathode ray tube (CRT). Additionally, the information handling system 100 may include an input device 112, such as a keyboard, and/or a cursor control device, such as a mouse, touchpad, or gesture or touch screen input. The information handling system 100 may also include a head mounted display 118, which may display images using, for example, a curved mirror based reflection, a waveguide based method or a light guide based method. Waveguide methods may further include, but may not be limited to diffraction optics, holographic optics, polarized optics, and reflective optics. These are just examples, and it is contemplated the head mounted display 118 may use any method that reflects projected images in order to create an augmented reality. The information handling system 100 can also include a disk drive unit 116.

The information handling system 100 may also include an augmented reality assisted display security system 132 that may be operably connected to the bus 108. The augmented reality assisted display security system 132 computer readable medium 122 may also contain space for data storage. The augmented reality assisted display security system 132 may perform tasks related to reflecting sensitive information onto the host video display 110 via the head mounted display 118 such that only the wearer of the head mounted display 118 may view the sensitive information.

In some embodiments, the information handling system 100 may represent a head mounted display device computing system with display 118. In other embodiments, the head mounted display 118 may be connected wirelessly or via wire to a base information handling system represented by information handling system 100 in various embodiments described herein. A head mounted display system may include several of the various components of information handling system 100 described in embodiments herein. A head mounted display system may include an augmented reality system, a virtual reality system, a mixed reality head mounted display system, an extended reality head mounted display system, or other head mounted display systems in various embodiments of the present disclosure.

In an embodiment, the augmented reality assisted display security system 132 may communicate with the main memory 104, the processor 102, the host video display 110, the alpha-numeric input device 112, host video display 110, graphics processing unit 114, head mounted display 118, and the network interface device 120 via bus 108, and several forms of communication may be used, including ACPI, SMBus, a 24 MHZ BFSK-coded transmission channel, or shared memory.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Further, inter-device connectivity may be available via WPAN standards or via Bluetooth or similar standards. For example, the head mounted display device may be wired in some circumstances or may be connected via wireless connectivity in other embodiments to a base information handling system.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. It is understood that other devices such as peripheral devices may be connected via wireless or wired connectivity as well according to various protocols described herein.

The information handling system 100 can include a set of instructions 124 that can be executed to cause the computer system to perform any one or more of the methods or computer based functions disclosed herein. For example, instructions 124 may execute an augmented reality assisted display security system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the augmented reality assisted display security system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the augmented reality assisted display security system 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the augmented reality assisted display security system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The augmented reality assisted display security system 132 and the drive unit 116 may include a computer-readable medium 122 such as a magnetic disk, or a static memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
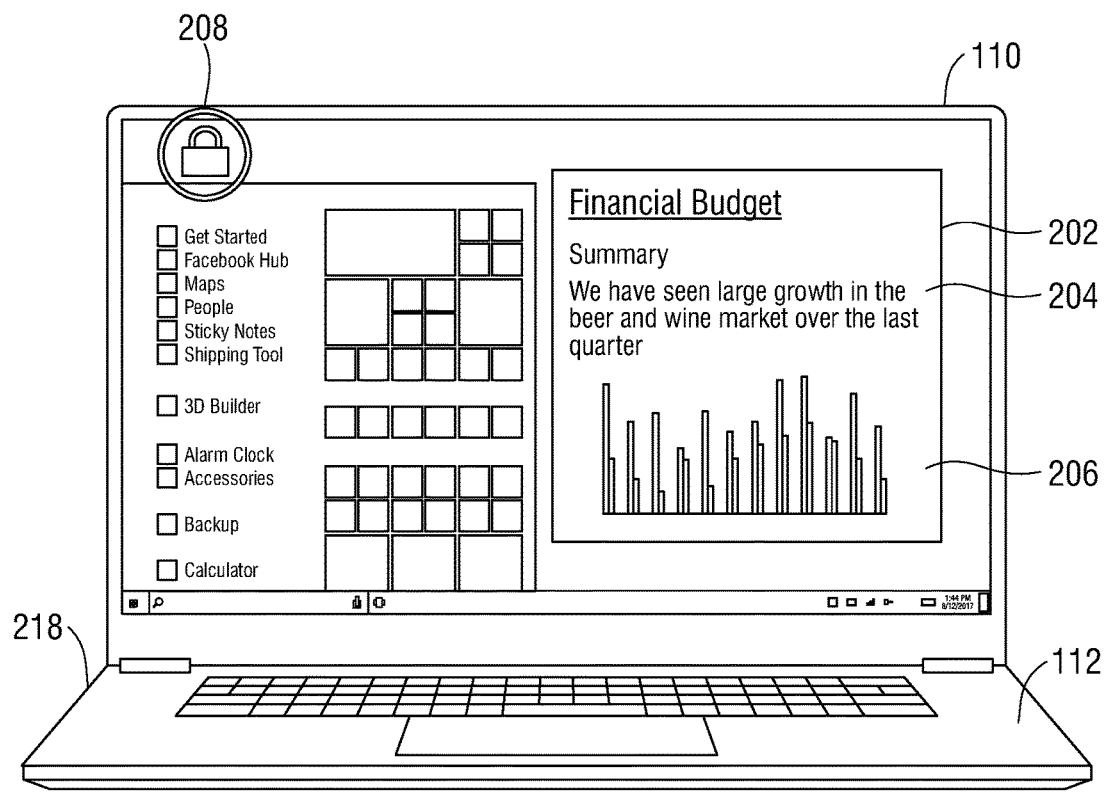
FIG. 2A is a graphical illustration of a host video display according to a first embodiment of the present disclosure.

FIG. 2A is a graphical illustration of a host video display displaying sensitive information according to a first embodiment of the present disclosure. A host video display 110 in an embodiment may be incorporated within a host information handling system 218, such as, for example, a laptop computing device, a tablet computing device, or a smartphone computing device. The host information handling system 218 in an embodiment may also have a keyboard device 112.

The host video display 110 in an embodiment may operate to display digital content, such as, for example, digital content 202 within an application executed by the operating system of the host information handling system 218, and a watermark 208. The watermark 208 in an embodiment may operate to identify a location within the host video display 110 and may take any form, including but not limited to text and images. The digital content 202 in an embodiment may include any visual information or content items including but not limited to text 204, video and/or still images 206. One or more content items in an embodiment may include sensitive, private, and/or confidential information. For example, one or more of the text 204 and still image 206 in an embodiment may contain information previously identified as sensitive (e.g. confidential/private).

In some embodiments, the digital content 202 may include a document or single file displayed pursuant to a single application. For example, digital content 202 in an embodiment may be a Microsoft® Word document, a Microsoft® PowerPoint document, or a secure web page. The whole document 202 in such an embodiment may be previously identified as sensitive. Sensitive information as described herein may include confidential and/or private information. In other embodiments, only portions of the document 202 may be identified as sensitive. For example, the text 204 in an embodiment may not be identified as sensitive, while the still image 206 may be identified as sensitive.

Figure 2B:
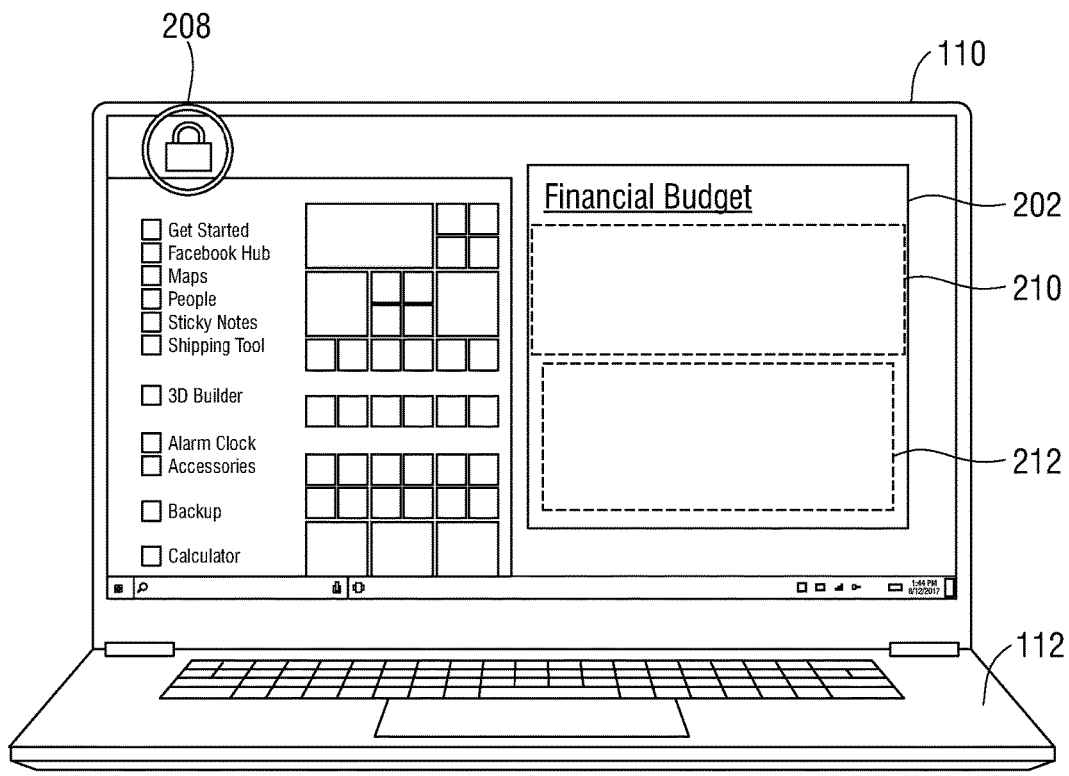
FIG. 2B is a graphical illustration of a host video display according to a second embodiment of the present disclosure.

FIG. 2B is a graphical illustration of a host video display preventing the display of sensitive sensitive information according to a second embodiment of the present disclosure. As described herein, the augmented reality assisted display security system in an embodiment may prevent the display of sensitive information via the host display 110. For example, in an embodiment described with reference to FIG.

2A, the text 204 and the still image 206 may be previously identified as sensitive information. In such an embodiment, the augmented reality assisted display security system may display the digital content 202, but may deduct or redact the sensitive text 204 and/or sensitive still image 206 from the display. Such a deduction in one embodiment may include removing the sensitive or secure digital content (e.g. sensitive text 204 and sensitive still image 206) from the display. In another embodiment, such a deduction may include redacting the secure data content by displaying the sensitive or secure digital information via the host display, but covering the secure digital information such that it may not be viewed via the host display alone.

As shown in FIG. 2B, upon display of the digital content 202 without the sensitive text or sensitive still image in the host video display 110, the augmented reality assisted display security system in an embodiment may replace the deducted sensitive information with one or more placeholders. For example, the augmented reality assisted display security system in an embodiment may replace the deducted sensitive text with placeholder 210 represented by a dashed line border. As another example, the augmented reality assisted display security system in an embodiment may replace the deducted sensitive still image with placeholder 212 represented by a dashed line border. Placeholders in some embodiments may include a void of texts or images, or a portion of the desktop image. For example, in an embodiment in which the deduction involves removing the sensitive information from the content displayed on the host video display, the placeholder may include a void where the secure content has been removed. As another example, in an embodiment in which deduction involves redacting the secure data content (e.g. covering it such that it may not be viewed via the host display alone), the placeholder may include the cover used to inhibit viewing of the secure content via the host display alone. In such an embodiment, the "cover" may include a non-transparent watermark. In such a way, the augmented reality assisted display security system in an embodiment may disallow display of sensitive information on the host video display 110, which is visible to third parties nearby, while leaving space on the host video display 110 for the display of the sensitive content via a head mounted display.

Figure 2C:
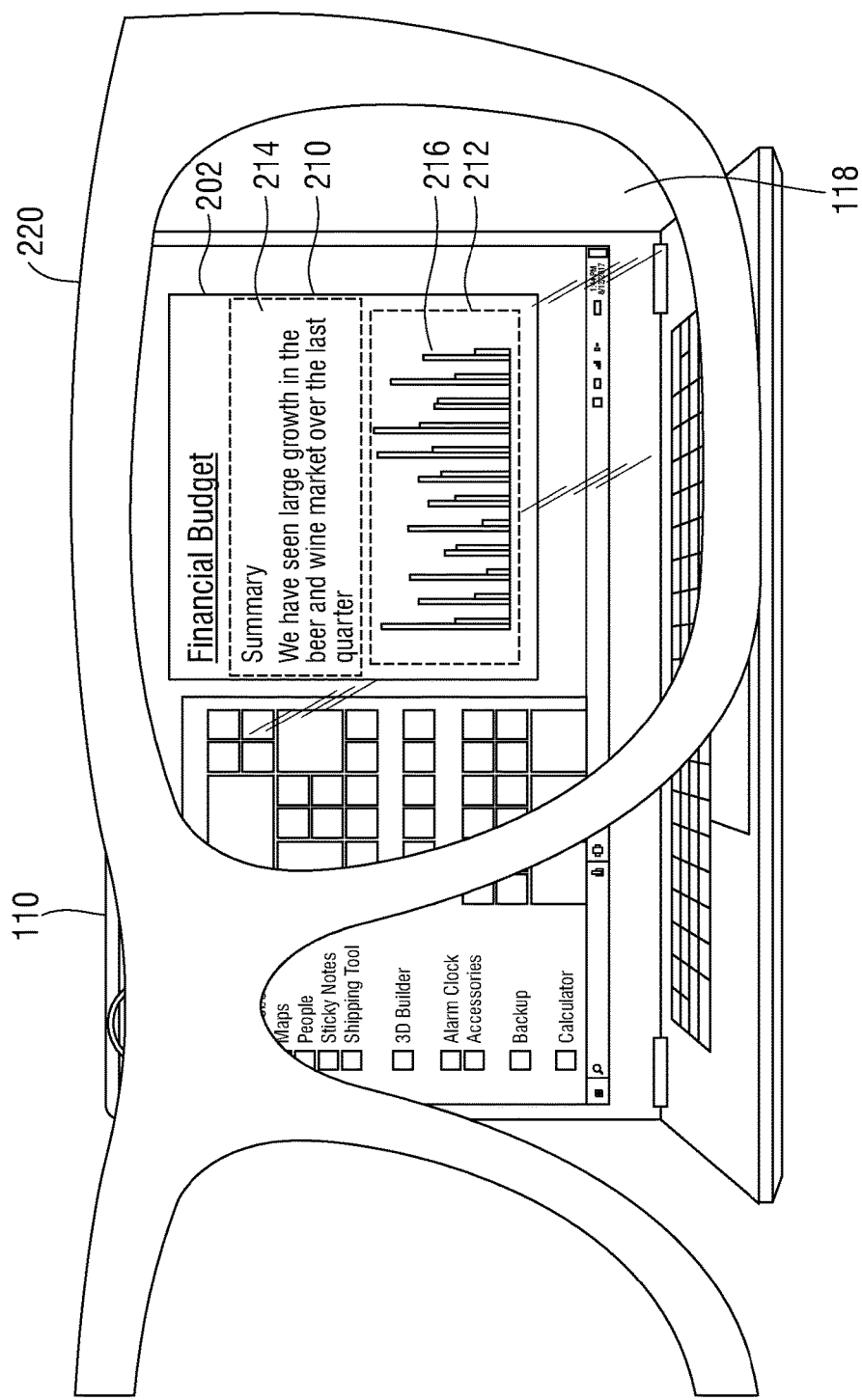
FIG. 2C is a graphical illustration of an augmented reality user interface including a host video display and a head mounted video display according to an embodiment of the present disclosure.

FIG. 2C is a graphical illustration of an augmented reality user interface including a host video display preventing the display of sensitive information and a head mounted video display displaying the sensitive information according to an embodiment of the present disclosure. A head mounted display device 220 in an embodiment, wearable around the user's head and/or eyes may include a head mounted display 118 having the capability of reflecting projected images as well as allowing the user to see through it to view the host video display 110. Viewing the host video display 110 in an embodiment through the head mounted display 118 while the head mounted display 118 also reflects projected images may generate a multiple device augmented user interface surface that appears to the wearer of the head mounted display device 220 to be a single user interface, coplanar with the host video display 110.

For example, a head mounted display device 220 in an embodiment may operate to overlay images displayed within the head mounted display 118 onto the user's view of the host video display 110. The head mounted display device 220 in an embodiment may be capable of identifying one or more placeholders 210 and/or 212 displayed by the host video display 110, and instructing the head mounted display 118 to project images of the sensitive information deducted by the host information handling system onto the user's view of the host video display 110. For example, the head mounted display device 220 may locate placeholder 210 displayed on the host video display 110, and may instruct the head mounted display 118 to project an image 214 representing the sensitive text deducted by the host information handling system within the placeholder 210. As another example, the head mounted display device 220 may locate placeholder 212 displayed on the host video display 110, and may instruct the head mounted display 118 to project an image 216 representing the sensitive still image deducted by the host information handling system within the placeholder 212. In such a way, the augmented reality assisted display security system may display the sensitive information 214 and 216 such that only the wearer of the head mounted display device may view it.

Figure 3:
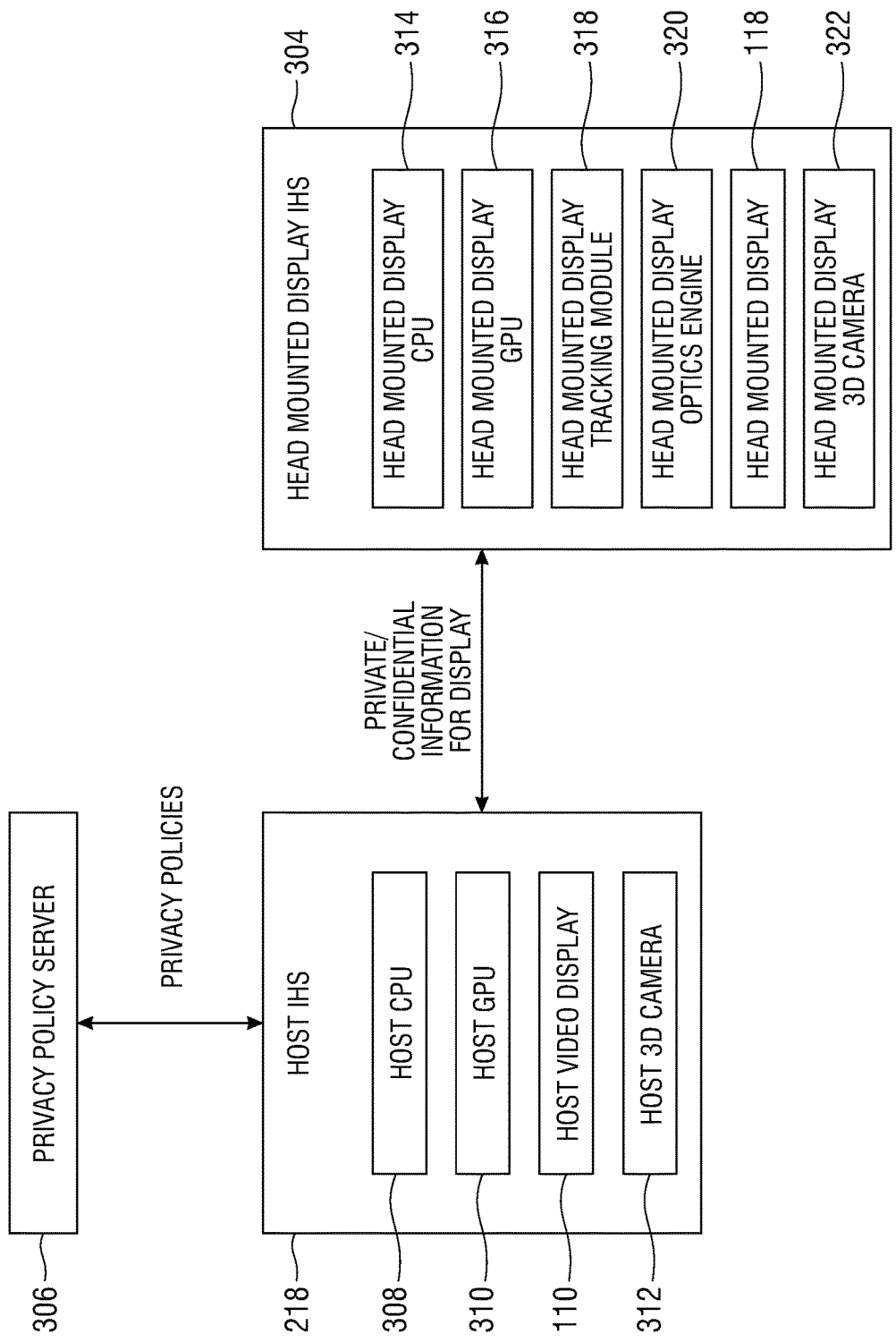
FIG. 3 is a block diagram of communication between a host information handling system and a head mounted display information handling system according to an embodiment of the present disclosure.

FIG. 3 is a block diagram of an augmented reality assisted display security system directing communication between a host information handling system and a head mounted display information handling system according to an embodiment of the present disclosure. The augmented reality assisted display security system in an embodiment may operate upon a host information handling system 218, a head mounted display information handling system 304, a privacy policy server 306, or any combination of these three. In other embodiments, the augmented reality assisted display security system may operate partially, completely, or across the host information handling system 218 and/or the head mounted display information handling system 304, and the privacy policy server 306 may communicate remotely with the host information handling system 218 via a network.

The host information handling system 218 in an embodiment may include a host CPU 308, a host GPU 310, a host video display 110, and a host three-dimensional camera 312. The host CPU 308 may operate to receive privacy policies via the privacy policy server 306. The privacy policy server 306 may store a plurality of privacy policies, each of which may identify one or more digital content items that may be labeled or identified as sensitive, confidential, and/or private. These privacy policies may be created prior to the display of any sensitive, confidential, and/or private information, and may be maintained by individual users, and/or by IT professionals directing functionality of an enterprise network. Secure data may be labeled as such in an embodiment via metadata identification, or pursuant to identification via a term recognition algorithm of the words "confidential," "private," "secure," of "sensitive information" within the digital content item. Each privacy policy may be associated with a single authorized user, groups of authorized users, or all authorized users within a given network. Further, the digital content items identified within each privacy policy as sensitive information may identify as sensitive information specific files or data records, all files or data records of a given type (e.g. Microsoft® Excel), and/or subparts of digital content within a single data record or file. For example, in an embodiment described with reference to FIG. 2A, the text 204 may not be identified as sensitive, while the still image 206 may be identified as sensitive.

Returning to FIG. 3, the host CPU 308 in an embodiment may also operate to receive a command to display digital content, to identify information within that digital content labeled as sensitive within one or more privacy policies, to communicate the identification of sensitive information or content to the host GPU 310, and/or to transmit the identified sensitive information to the head mounted display information handling system 304. The CPU 308 may include, but may not be limited to an Intel® Core class processor, ARM® brand processors, Qualcomm® Snapdragon processors, or other processors and chipsets.

The GPU 310 or the CPU 308 in an embodiment may operate to deduct the identified sensitive portion of the digital content the CPU 308 has been instructed to display. The GPU 310 or CPU 308 in such an embodiment may then instruct the host video display 110 to display the digital content, without the deducted sensitive information, and with a watermark and/or placeholder where the sensitive information has been deducted. In some embodiments, the host GPU 310 or host CPU 308 may also operate to render a three-dimensional image of the deducted sensitive information as viewed from the perspective of the head mounted display 118, which may be transmitted to the head mounted display information handling system 304. In still other embodiments, the CPU 308 may perform each of these operations.

The host three-dimensional camera 312 in an embodiment may operate to capture a three-dimensional image of the head mounted display 118, as viewed from the perspective of the host video display 110. The host GPU 310 or the host CPU 308 in such an embodiment may then determine the distance between the host video display 110 and the head mounted display 118, as well as the orientation of the host video display 110 with respect to the head mounted display 118 based on the three-dimensional image captured by the host three-dimensional camera 312. The distance and orientation determined by the host GPU 310 or the host CPU 308 in an embodiment may be used to determine a location of the sensitive information within a three-dimensional primitive generated at the head mounted display information handling system 304, as described herein. The distance and orientation may also be used to render a three-dimensional image of the secure information for display by the head mounted display 118.

The head mounted display device information handling system 304 in an embodiment may be incorporated within a head mounted display device, wearable around the user's head and/or eyes and having the capability of reflecting projected images as well as allowing the user to see through it. A user may see through a head mounted display 118 to view the host video display 110. Viewing the host video display 110 through the head mounted display 118 while the head mounted display 118 also reflects projected images may generate a multiple device augmented user interface surface that appears to the wearer of the head mounted display 118 to be a single user interface, coplanar with the host video display 110.

The head mounted display information handling system 304 may include a head mounted display CPU 314, a head mounted display GPU 316, a head mounted display tracking module 318, a head mounted display optics engine 320, a head mounted display 118, and a head mounted display three-dimensional camera 322. The head mounted display CPU 314 in an embodiment may operate to receive the sensitive (e.g. private/confidential) information from the host information handling system 218. In some embodiments, the head mounted display CPU 314 may also receive from the host information handling system 218 the three-dimensional image captured by the host three-dimensional camera 312, and/or an identification of the location of the one or more placeholders with respect to either the watermark or the physical boundaries of the host video display 110. In still other embodiments, the head mounted display CPU 314 may also receive a rendered image of the sensitive information from the host information handling system 218.

The host three-dimensional camera 312 and the head mounted display three-dimensional camera 322 may include a three-dimensional (3-D) camera, e.g., a stereo triangulation camera, a sheet of light triangulation camera, a structured light camera, a time-of-flight camera, an interferometry camera, a coded aperture camera, or any other type of 3-D camera. The head mounted display three-dimensional camera 322 in an embodiment may capture a three-dimensional image of the host video display 110 as viewed from the perspective of the head mounted display 118, including the physical boundaries of the host video display 110, while the host video display 110 displays digital content, one or more placeholders for deducted sensitive information, and/or one or more watermarks, as described herein. The three-dimensional image captured by the head mounted display three-dimensional camera 322 in an embodiment may be used to determine the position and orientation of the placeholders, watermarks, digital content, physical boundaries of the host video display 110, and the head mounted display 118 with respect to one another.

The head mounted display tracking module 318 in an embodiment may access the three-dimensional image of the host video display 110 captured by the head mounted display three-dimensional camera 322. In some embodiments, the tracking module 318 may identify the physical boundaries of the host video display 110, and/or the watermark displayed on the host video display 110 within the three-dimensional image captured by the head mounted display three-dimensional camera 322. Once the physical boundaries of the host video display 110, and/or the watermark displayed on the host video display 110 are identified by the tracking module 318 in an embodiment, the distance between these identified items, the head mounted display 118, and the placeholder for the display of the secure content and their orientations with respect to one another may be determined. For example, the head mounted display GPU 316, or the head mounted display CPU 314 may analyze the three-dimensional image captured by the host three-dimensional camera 312, and couple that analysis with the identification of the location of the one or more placeholders with respect to either the watermark or the physical boundaries of the host video display 110, as received from the host information handling system 218.

In other embodiments, the position and orientation with respect to one another of the placeholder, and head mounted display 118 may be determined by the host GPU 310 or the host CPU 308. For example, the host GPU 310 or the host CPU 308 may determine the position and orientation of the head mounted display 118 with respect to the host three-dimensional camera 312 by analyzing a three-dimensional image of the head mounted display 118 captured by the host three-dimensional camera 312. The host GPU 310 or the host CPU 308 in an embodiment could use this information in conjunction with identification of the position of the placeholder for display of the secure information with respect to the location of the host three-dimensional camera 312 to determine the position and orientation of the head mounted display 118 with respect to the placeholder for display of the secure information via the head mounted display 118. In some embodiments, the host GPU 310 or the host CPU 308 may further render a three-dimensional image of the secure information for display by the head mounted display 118, based on the determined position and orientation of the placeholder with respect to the head mounted display 118. In such embodiments, the host CPU 308 may transmit the rendered three-dimensional image of the secure content to the head mounted display information handling system 304 for display by the head mounted display 118.

The head mounted display GPU 316 or head mounted display CPU 314 in an embodiment may generate a three-dimensional primitive of the head mounted display 118, host video display 110, placeholders for deducted sensitive information, and/or one or more watermarks based on the three-dimensional image captured by the head mounted display three-dimensional camera 322, and the information determined by the head mounted display tracking module 318 and the head mounted display GPU 316 or the head mounted display CPU 314. In other embodiments, the head mounted display GPU 316 or the head mounted display CPU 314 may generate the three-dimensional primitive of the head mounted display 118, and the placeholders for deducted sensitive information, based on the position and orientation of the placeholders with respect to the head mounted display 118, as determined by the analysis by the host GPU 310 or the host CPU 308 of a three-dimensional image captured by the host three-dimensional camera 312.

The head mounted display optics engine 320 in some embodiments may access the sensitive (e.g. private/confidential) information received from the host information handling system 218, and may render an image of the sensitive information. The image of the sensitive information may be rendered by the head mounted display optics engine 320 in an embodiment based on the position and orientation of the placeholder associated with that information within the three-dimensional primitive generated by the head mounted display GPU 316 or the head mounted display CPU 318. In other embodiments, the head mounted display CPU 314 may have received a rendered three-dimensional image of the sensitive information from the host information handling system 218. In such an embodiment, the optics engine 320 may not perform the rendering, and the head mounted display GPU 316 or the head mounted display CPU 314 may simply insert the received rendered three-dimensional image into the three-dimensional primitive of the placeholder for display by the head mounted display 118.

Upon generation of the three-dimensional primitive by the head mounted display GPU 316 or the head mounted display CPU 314, and rendering of the a three-dimensional image of the sensitive information by either the head mounted display optics engine 320, the host GPU 310, or the host CPU 308, the head mounted display GPU 316 or the head mounted display CPU 314 may instruct the head mounted display 118 to display the rendered sensitive information according to the three-dimensional primitive. In such a way, the head mounted display 118 may project or reflect the three-dimensional image of the sensitive text onto the host video display 110, as viewed through the head mounted display 118, such that the sensitive text appears to be coplanar with and fit within the boundaries of the placeholder associated with that sensitive text and displayed on the host video display 110.

Figure 4:
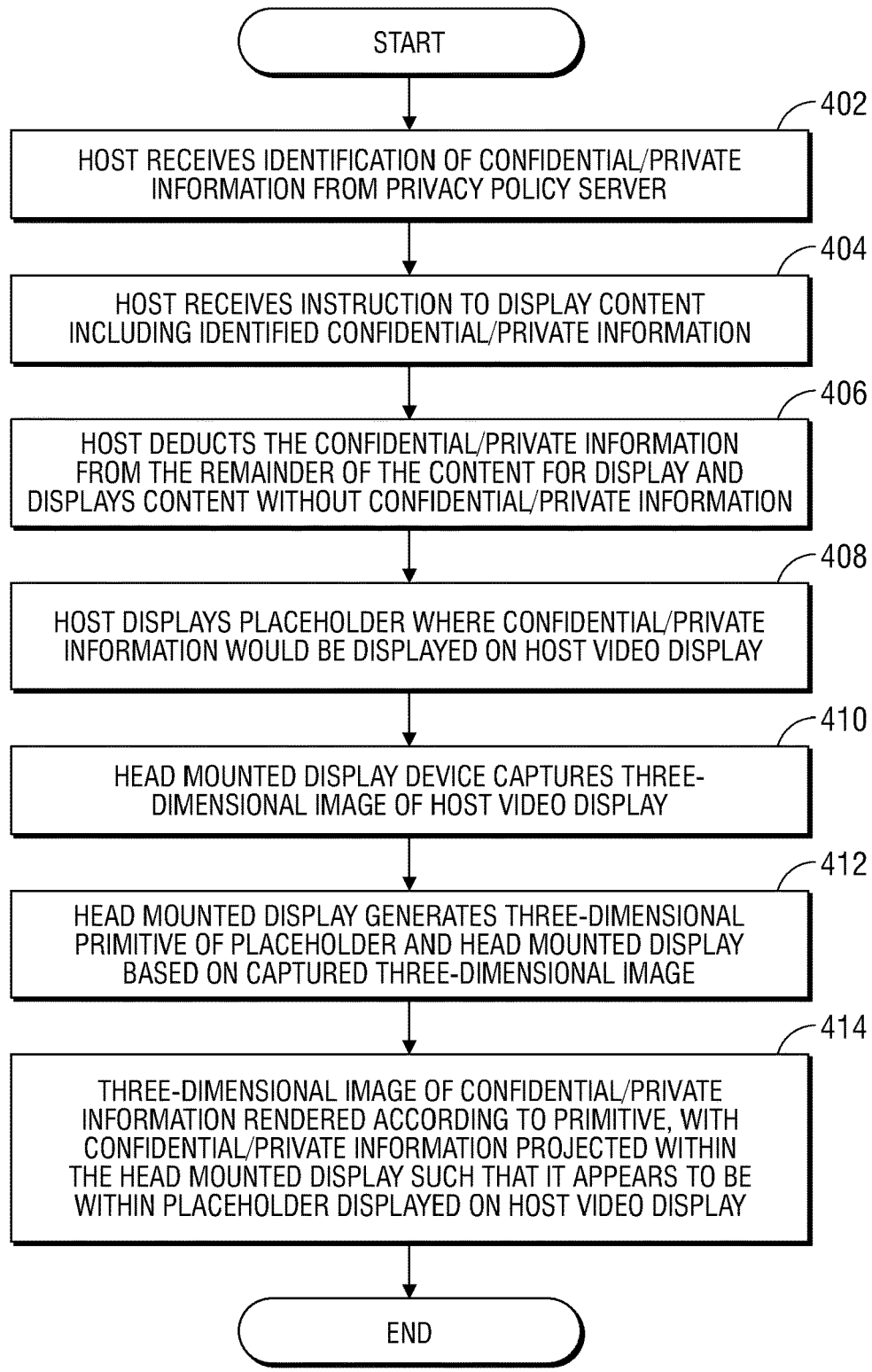
FIG. 4 is a flow diagram illustrating a method for displaying sensitive information via a head mounted display according to an embodiment of the present disclosure.

FIG. 4 is a flow diagram illustrating a method for displaying sensitive information via a head mounted display within an augmented user interface according to an embodiment of the present disclosure. A head mounted display device including a head mounted display, wearable around the user's head and/or eyes, may have the capability of instructing the head mounted display to reflect projected images as well as allowing the user to see through the head mounted display to view a host video display in an embodiment. Viewing the host video display in an embodiment through the head mounted display while the head mounted display also reflects projected images may generate a multiple device augmented user interface surface that appears to the wearer of the head mounted display device to be a single user interface. The flow diagram of FIG. 4 illustrates a method for generating such an augmented user interface, wherein sensitive, confidential, or private information is viewable only via the head mounted display.

At block 402, the host information handling system in an embodiment may receive an identification of sensitive, confidential, and/or private information from a privacy policy server. In an embodiment, the privacy policy server may be incorporated within the host information handling system, or may be located remotely from the host information handling system and in communication with the host information handling system via a wired or wireless network. The privacy policy server in an embodiment may store a plurality of privacy policies, each of which may identify one or more digital content items that may be labeled or identified as sensitive, confidential, and/or private. These privacy policies may be created prior to the display of any sensitive, confidential, and/or private information, and may be maintained by individual users, and/or by IT professionals directing functionality of an enterprise network. Each privacy policy may be associated with a single authorized user, groups of authorized users, or all authorized users within a given network. Further, the digital content items identified within each privacy policy as sensitive information may identify as sensitive information specific files or data records, all files or data records of a given type (e.g. Microsoft® Excel), and/or subparts of digital content within a single data record or file. For example, in an embodiment described with reference to FIG. 2A, the text 204 may not be identified as sensitive, while the still image 206 may be identified as sensitive.

In an embodiment at block 404, the host information handling system may receive a user request or instruction to display content, including the sensitive, confidential, and/or private information identified at block 402. For example, in an embodiment described with reference to FIG. 2A, the host information handling system 218 may receive a user request or instruction to display digital content file 202, including an image 206 and text 204. As described directly above with respect to block 402, the host information handling system 218 may have received a privacy policy identifying the digital content file 202, the image 206, and/or the text 204 as sensitive, private, or confidential information.

At block 406, the host information handling system in an embodiment may deduct the identified sensitive, confidential, and/or private information from the remainder of the digital content the user requested be displayed, and display the digital content without the sensitive, confidential, or private information. For example, in an embodiment described with reference to FIG. 2B, the augmented reality assisted display security system operating at least partially within the host information handling system 218 may display the digital content 202, but may deduct or redact the sensitive text 204 and sensitive still image 206 from the display. In other embodiments, the augmented reality assisted display security system may display the digital content 202, but may deduct or redact only one of the text 204, or the still image 206 from the display, based upon identification of only one of these content items as sensitive information in a privacy policy. In yet another embodiment, the augmented reality assisted display security system may disallow display of the entire digital content file 202, based upon identification of the entire digital file 202 as sensitive information in a privacy policy. Deduction of secure content in an embodiment may include, but may not be limited to removing the content from the display via the host display, and covering or obfuscating the display of the content.

The host information handling system in an embodiment may display one or more placeholders on the host video display where the sensitive, confidential, or private information has been deducted at block 408. For example, in an embodiment described with reference to FIG. 2B, upon display of the digital content 202 without the sensitive text or sensitive still image in the host video display 110, the augmented reality assisted display security system operating at least partially within the host information handling system 218 may replace the deducted sensitive text with placeholder 210 represented by a dashed line border. As another example, the augmented reality assisted display security system in an embodiment may replace the deducted sensitive still image with placeholder 212 represented by a dashed line border. Placeholders in some embodiments may include a void of texts or images, or a portion of the desktop image. For example, in an embodiment in which the deduction involves removing the sensitive information from the content displayed on the host video display, the placeholder may include a void where the secure content has been removed. As another example, in an embodiment in which deduction involves redacting the secure data content (e.g. covering it such that it may not be viewed via the host display alone), the placeholder may include the cover used to inhibit viewing of the secure content via the host display alone. In such an embodiment, the "cover" may include a non-transparent watermark. In such a way, the augmented reality assisted display security system in an embodiment may disallow display of sensitive information on the host video display 110, which is visible to third parties nearby, while leaving space on or near the host video display 110 for the display of the sensitive content via a head mounted display.

At block 410, in an embodiment, the head mounted display device may capture a three-dimensional image of the host video display. For example, in an embodiment described with reference to FIG. 2C, the head mounted display device 220 in an embodiment may include a three-dimensional camera, which may capture a three-dimensional image of the host video display 110 as viewed from the perspective of the head mounted display 118. Such a three-dimensional image may include an image of the physical boundaries of the host video display 110 displaying digital content 202. Such an image may further include one or more placeholders 210 and 212 for deducted sensitive information, and/or one or more watermarks 208, as described herein. The three-dimensional image captured by the head mounted display device 220 three-dimensional camera in an embodiment may be used to determine the position and orientation of the placeholders 210 and 212, watermarks 208, digital content 202, and/or physical boundaries of the host video display 110 with respect to one another.

In other embodiments, at block 410, the host information handling system may capture a three-dimensional image of the head mounted display. For example, in an embodiment described with reference to FIG. 3, the host three-dimensional camera 312 in an embodiment may operate to capture a three-dimensional image of the head mounted display 118, as viewed from the perspective of the host video display 110. The host GPU 310 or host CPU 310 in such an embodiment may determine the position and orientation of the head mounted display 118 with respect to the placeholders 210 and 212, based on the three-dimensional image captured by the host three-dimensional camera 312 and a known position and orientation of the placeholder 210 and 212 with respect to the host three-dimensional camera.

At block 412, in an embodiment, the head mounted display device may generate a three-dimensional primitive of a placeholder and a head mounted display based on the captured three-dimensional image. A three-dimensional primitive in an embodiment may include a modeled three-dimensional environment operating to model locations and orientations of a plurality of objects (e.g. a head mounted display, a host video display, and one or more placeholders displayed by the host video display) with respect to one another into a virtual reality. For example, in an embodiment described with reference to FIG. 2C, the head mounted display device may generate a three-dimensional primitive operating to model the location and orientation of the head mounted display 118 with respect to the placeholders 210 and 212 in a three-dimensional virtual environment. The three-dimensional primitive may be generated in an embodiment by the head mounted display GPU. In another embodiment, the three-dimensional primitive may be generated by the head mounted display CPU.

At block 414, a three-dimensional image of the confidential/private information may be rendered in an embodiment according to the three-dimensional primitive. The head mounted display device may render the three-dimensional image of the confidential/private information in some embodiments, and the host information handling system may render the confidential/private information in other embodiments. For example, the head mounted display information handling system in a first embodiment may receive the confidential/private information from the host information handling system, and an optics engine of the head mounted display information handling system in an embodiment may render the confidential/private information according to the location of its primitive within the three-dimensional primitive generated by the head mounted display GPU or the head mounted display CPU. As another example, and in a second embodiment, the host GPU or the host CPU may render the confidential/private information and transmit the rendered confidential/private information to the head mounted display information handling system. The three-dimensional image of the confidential/private information may be rendered in an embodiment such that it may be projected within the head mounted display of the head mounted display device. In such an embodiment, the three-dimensional image of the confidential/private information may be projected via the head mounted display based on the rendering such that it appears to be within the placeholder displayed by the host video display. The method may then end.

Figure 5:
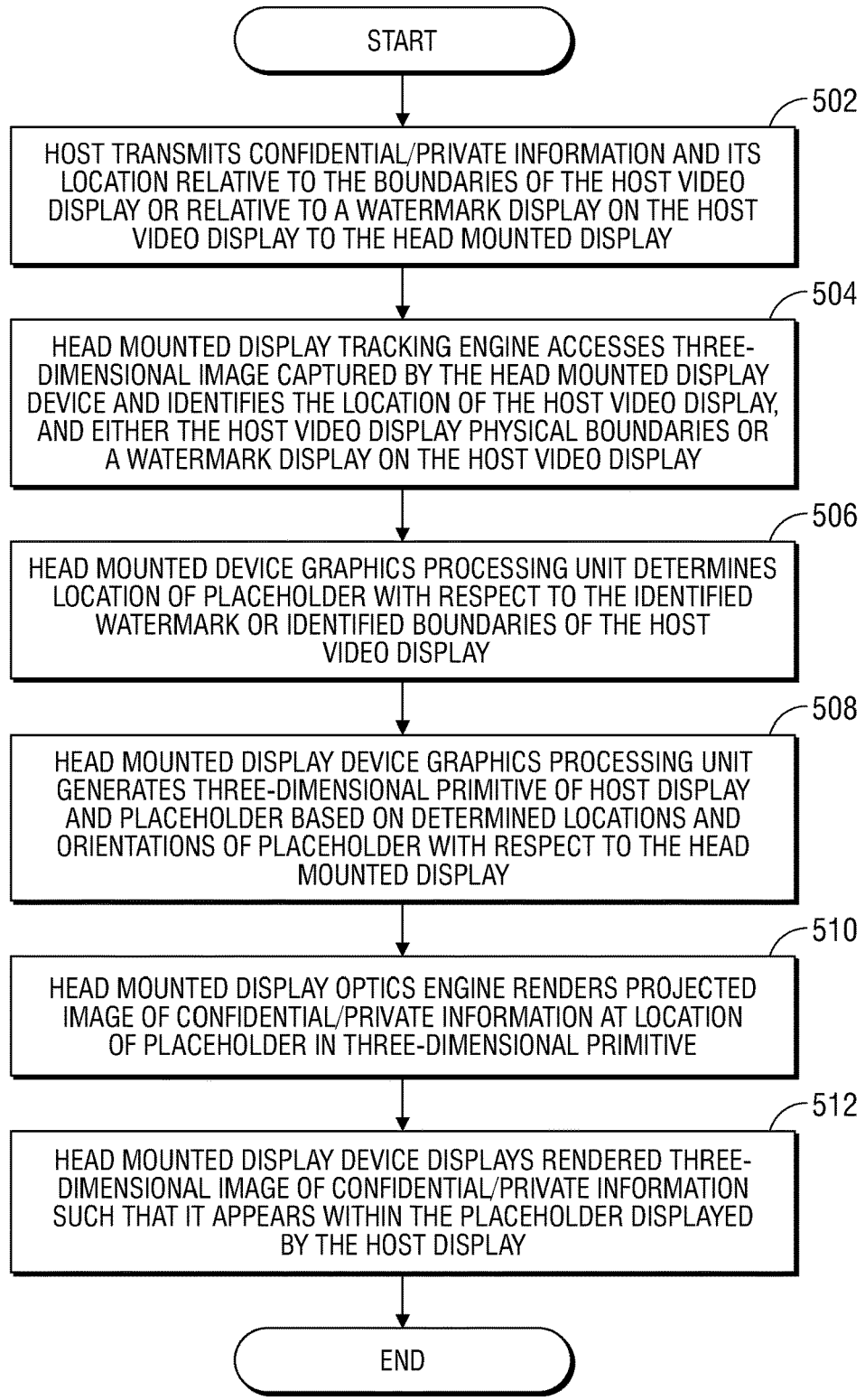
FIG. 5 is a flow diagram illustrating a method for a head mounted display device rendering sensitive information for display according to an embodiment of the present disclosure.

FIG. 5 is a flow diagram illustrating a method for a head mounted display device rendering sensitive information for display via the head mounted display according to an embodiment of the present disclosure. As described herein, the head mounted display device may render the three-dimensional image of the confidential/private information in some embodiments, and the host information handling system may render the confidential/private information in other embodiments. The flow diagram of FIG. 5 describes a method of rendering the confidential/private information via the head mounted display information handling system of the head mounted display device.

At block 502, in an embodiment, the host information handling system may transmit the confidential/private information and the location where it should be projected by the head mounted display relative to the position within the host video display of an identified object. For example, in an embodiment described with reference to FIG. 2A, the host information handling system 218 may transmit the confidential/private information 204, and/or 206 to the head mounted display information handling system. Such confidential/private information may be projected via the head mounted display in an embodiment described with reference to FIG. 2C as confidential/private information 214, and/or 216.

In one embodiment, the host information handling system may transmit the location where the confidential/private information should be projected by the head mounted display relative to the boundaries of the host video display to the head mounted display information handling system. For example, in an embodiment described with reference to FIG. 2C, the host information handling system may transmit the location where the confidential/private information 214 and/or 216 should be projected by the head mounted display 118 relative to the physical boundaries of the host video display 110. In another embodiment, the host information handling system may transmit the location where the confidential/private information should be projected by the head mounted display relative to a watermark location on the host video display to the head mounted display information handling system. For example, in another embodiment described with reference to FIG. 2C, the host information handling system may transmit the location where the confidential/private information 214 and/or 216 should be projected by the head mounted display 118 relative to the watermark (not shown).

In other embodiments, at block 502, the host information handling system may transmit an identification of the position and orientation of the placeholders with respect to the head mounted display based on a three-dimensional image captured by the host three-dimensional camera. For example, in an embodiment described with reference to FIG. 3, the host GPU 310 or the host CPU 308 may determine the position and orientation of the head mounted display 118 with respect to the host three-dimensional camera 312 by analyzing a three-dimensional image of the head mounted display 118 captured by the host three-dimensional camera 312. The host GPU 310 or the host CPU 308 in an embodiment could use this information in conjunction with identification of the position of the placeholder for display of the secure information with respect to the location of the host three-dimensional camera 312 to determine the position and orientation of the head mounted display 118 with respect to the placeholder for display of the secure information via the head mounted display 118.

At block 504, in an embodiment, the head mounted device tracking engine may access a three-dimensional image captured by the head mounted display device and identify the location of an object displayed by the host video display. Identification of the location of such an object displayed on the host video display in an embodiment may be used to determine the location where the confidential/private information should be rendered. This step may include identification of the location of the watermark within the three-dimensional image. Identification of the location of the watermark in an embodiment may be used to determine the location where the confidential/private information should be rendered in an embodiment in which the head mounted display device has received an indication from the host information handling system of the location of the placeholders for the confidential/private information with respect to the watermark. In another embodiment, this step may include identification of the location of the physical boundaries of the host video display within the three-dimensional image. Identification of the location of the physical boundaries of the host video display in an embodiment may be used to determine the location where the confidential/private information should be rendered in an embodiment in which the head mounted display device has received an indication from the host information handling system of the location of the placeholders for the confidential/private information with respect to the physical boundaries of the host video display.

At block 506, in an embodiment, the head mounted display GPU may determine the location of the placeholders with respect to the identified watermark or identified boundaries of the host video display. For example, in one embodiment, the head mounted display device may have received identification of the location of the placeholders with respect to the physical boundaries of the host video display from the host information handling system at block 502. In such an embodiment, the head mounted display GPU may combine this information with the identification at block 504 of the location of the physical boundaries of the host video display within the three-dimensional image captured by the head mounted display three-dimension camera to determine the location and orientation of the placeholder with respect to the head mounted display. As another example, and as a second embodiment, the head mounted display device may have received identification of the location of the placeholders with respect to a watermark display on the host video display from the host information handling system at block 502. In such an embodiment, the head mounted display GPU may combine this information with the identification at block 504 of the location of the watermark displayed on the host video display within the three-dimensional image captured by the head mounted display three-dimension camera to determine the location and orientation of the placeholder with respect to the head mounted display. In another embodiment, the head mounted display CPU may perform the operations of block 506.

The head mounted display GPU in an embodiment may generate a three-dimensional primitive of the head mounted display and the placeholders based on the determined location and orientation of the head mounted display with respect to the placeholders at block 508. A three-dimensional primitive in an embodiment may include a modeled three-dimensional environment operating to model locations and orientations of a plurality of objects (e.g. a head mounted display, a host video display, and one or more placeholders displayed by the host video display) with respect to one another into a virtual reality. In one example embodiment, the head mounted display GPU may generate such a virtual three-dimensional environment based on the location and orientation of the head mounted display with respect to the placeholder determined by the head mounted display GPU at block 506. In another example embodiment, the head mounted display GPU may generate such a virtual three-dimensional environment based on the location and orientation of the head mounted display with respect to the placeholder determined by the host GPU and transmitted to the head mounted display device at block 502. In another embodiment, the head mounted display CPU may perform the operations of block 508.

At block 510, in an embodiment, the head mounted display optics engine may render the projected image of the confidential/private information at the location of the placeholder in the three-dimensional primitive. As described above with respect to block 508, the head mounted display GPU or head mounted display CPU may generate a three-dimensional primitive including at least a primitive of the head mounted display and a primitive of the placeholder for the confidential/private information. The head mounted display optics engine in an embodiment may access the confidential/private information received from the host at block 502, and may render that information into a three-dimensional image according to the location of the placeholder primitive.

The head mounted display in an embodiment may display the rendered three-dimensional image of the confidential/private information at block 512 such that it appears within the placeholder displayed by the host video display. For example, in an embodiment described with reference to FIG. 2C, the head mounted display device 118 may project an image 214 rendered by the head mounted display optics engine and representing the sensitive text deducted by the host information handling system within the placeholder 210 displayed on the host video display 110. As another example, the head mounted display 118 may project an image 216 rendered by the head mounted display optics engine and representing the sensitive still image deducted by the host information handling system within the placeholder 212 displayed by the host video display 110. In such a way, the augmented reality assisted display security system may display the sensitive information 214 and 216 such that only the wearer of the head mounted display device 220 may view it.

Figure 6:
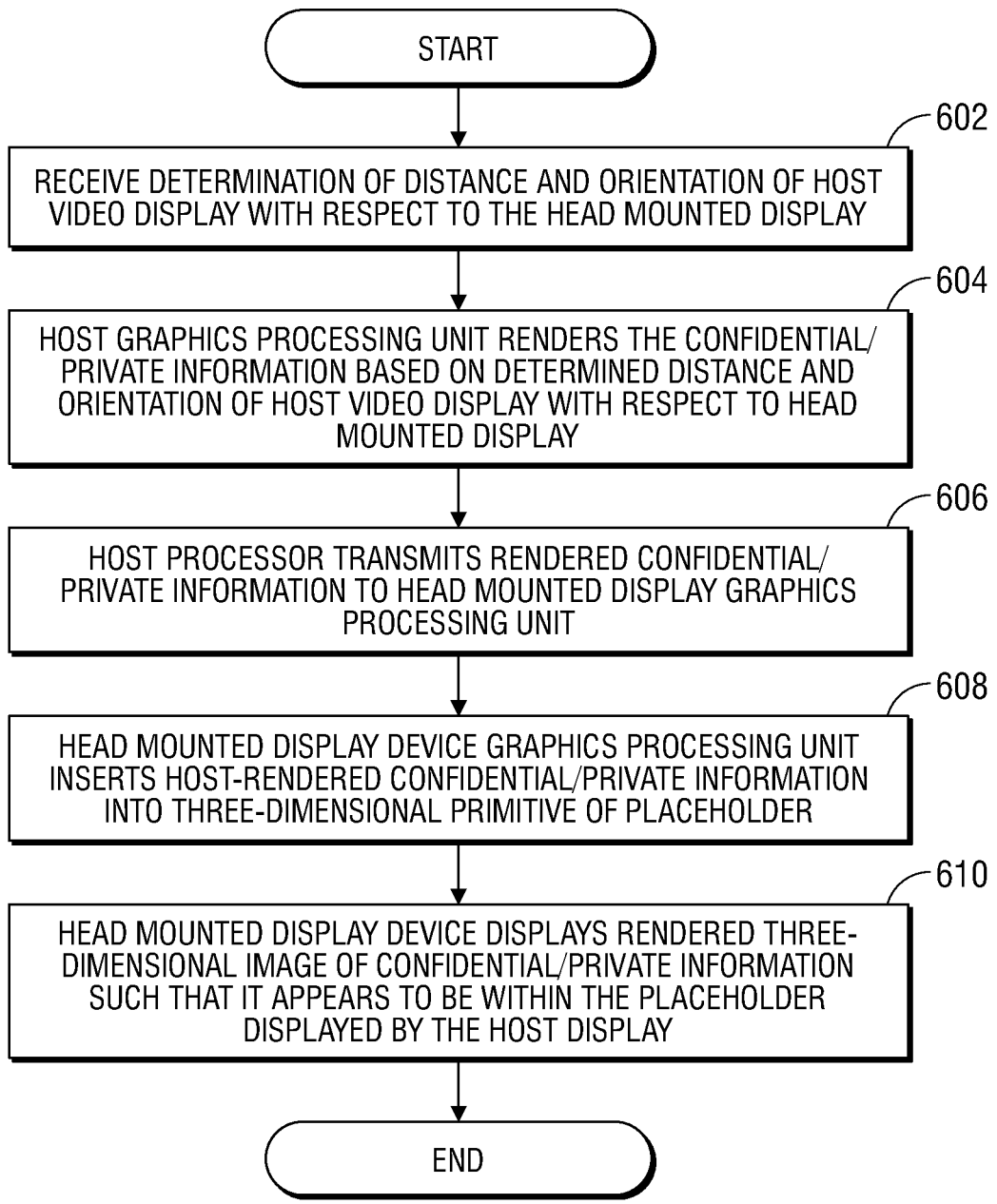
FIG. 6 is a flow diagram illustrating a method for a host information handling system rendering sensitive information for display via a head mounted display according to an embodiment of the present disclosure.

FIG. 6 is a flow diagram illustrating a method for a host information handling system rendering sensitive information for display via a head mounted display according to an embodiment of the present disclosure. As described herein, the head mounted display device may render the three-dimensional image of the confidential/private information in some embodiments, and the host information handling system may render the confidential/private information in other embodiments. The flow diagram of FIG. 6 describes a method of rendering the confidential/private information via the host information handling system.

At block 602, the head mounted display device may receive a determination of the distance and orientation of the host video display with respect to the head mounted display. In an embodiment, a host three-dimensional camera operating within the host information handling system may capture a three-dimensional image of the head mounted display. In such an embodiment, the host GPU or the host CPU may determine the distance and orientation of the host three-dimensional camera with respect to the head mounted display based on analysis of this three-dimensional image captured by the host three-dimensional camera. The host GPU or host CPU may combine this information with a known position and orientation of the placeholder with respect to the host three-dimensional camera to determine a position and orientation of the head mounted display with respect to the placeholder.

The host graphics processing unit in an embodiment may render the confidential/private information redacted from display on the host video display based on the determined distance and orientation of the host video display with respect to the head mounted display at block 604. For example, by determining the distance between the head mounted display and the host video display, as well as the angle of the host video display screen, as viewed by the head mounted display, the host GPU may determine how the confidential/private information should be displayed via the head mounted display in order to make the confidential/private information appear within the boundaries of the placeholder displayed by the host video display, and to appear to be coplanar with the host video display. Upon making such a determination, the host GPU or an optics engine within the host information handling system may generate a rendered image of the confidential/private information. In other embodiments, the host CPU may perform the operations of block 604.

At block 606, in an embodiment, the host processor may transmit the image of the confidential/private information rendered at block 604 to the head mounted display graphics processing unit. For example, in an embodiment described with reference to FIG. 3, the host CPU 308 of the host information handling system 218 may transmit the confidential/private information rendered by the host GPU 310 or host CPU 308 to the head mounted display CPU 314 within the head mounted display information handling system 304.

The head mounted display graphics processing unit or the head mounted display CPU in an embodiment may insert the host-rendered confidential/private information into the three-dimensional primitive of the placeholder at block 608. As described herein, the head mounted display GPU 316 or the head mounted display CPU 314 in an embodiment may have generated a three-dimensional primitive modeling the positions and orientations of the head mounted display 118 and the placeholder for the confidential/private information with respect to one another. For example, in an embodiment described with reference to FIG. 5 at block 508, the head mounted display GPU or the head mounted display CPU may generate a three-dimensional primitive of the head mounted display, and placeholder based on a three-dimensional image captured by the head mounted display three-dimensional camera, and an identification by the head mounted display tracking engine of the boundaries of the host video display within the three-dimensional image. As another example, the head mounted display GPU or head mounted display CPU may generate a three-dimensional primitive of the head mounted display, and placeholder, based on a three-dimensional image captured by the head mounted display three-dimensional camera, and an identification by the tracking engine of the head mounted display device of the watermark within the three-dimensional image. As yet another example, the head mounted display GPU or head mounted display CPU may use the location of the placeholder with respect to the head mounted display device received from the host information handling system, to generate a three-dimensional primitive of the head mounted display and the placeholder.

At block 610, in an embodiment, the head mounted display may display the three-dimensional image of the confidential/private information rendered by the host information handling system such that it appears to be within the placeholder displayed by the host video display. For example, in an embodiment described with reference to FIG. 2C, the head mounted display 118 may project an image 214 rendered by the host information handling system and representing the sensitive text deducted by the host information handling system within the placeholder 210 displayed on the host video display 110. As another example, the head mounted display 118 may project an image 216 rendered by the host information handling system and representing the sensitive still image deducted by the host information handling system within the placeholder 212 displayed by the host video display 110. In such a way, the augmented reality assisted display security system may display the sensitive information 214 and 216 such that only the wearer of the head mounted display device 220 may view it, but such that it appears to be within the placeholder displayed by the host display 110.

The blocks of the flow diagrams of FIGS. 4-6 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating an augmented reality assisted display security system comprising:
   a head mounted display within a head mounted display device;
   a three-dimensional camera co-located with the head mounted display capturing a three-dimensional image of a host display device displaying a placeholder for the display of a secure content and other digital content;
   a processor executing code instructions of the augmented reality assisted display security system to:
      determine a position and orientation of the head mounted display with respect to the placeholder of the host display device based on the three-dimensional image captured by the three-dimensional camera;
      generate a three-dimensional primitive of the head mounted display and the placeholder of the host display device based on the determined position and orientation;
      receive the secure content;
      render a three-dimensional image of the secure content within the three-dimensional primitive at the location within the three-dimensional primitive of the placeholder; and
   the head mounted display displaying the three-dimensional image of the secure content according to the three-dimensional primitive such that the rendered three-dimensional image of the secure content appears to be within the placeholder displayed on the host display device and appears to be coplanar with the host display device.

2. The information handling system of claim 1 further comprising:
   the processor executing code instructions to:
      identify a plurality of physical boundaries of the host video display within the three-dimensional image captured by the three-dimensional camera; and
      determine the position and orientation of the head mounted display with respect to the placeholder further based on the identification of the plurality of physical boundaries and an indication received from the host display device of a location of the placeholder with respect to the plurality of physical boundaries.

3. The information handling system of claim 1 further comprising:
   the three-dimensional image including a watermark displayed on the host display device;
   the processor executing code instructions to:
      identify the watermark within the three-dimensional image captured by the three-dimensional camera; and
      determine the position and orientation of the head mounted display with respect to the placeholder further based on the identification of the watermark and an indication received from the host display device of a location of the placeholder with respect to the watermark.

4. The information handling system of claim 3, wherein the location of the watermark displayed on the host display device matches the location of the placeholder displayed on the host display device.

5. The information handling system of claim 1, wherein the secure content includes text information.

6. The information handling system of claim 1, wherein the secure content includes a digital image.

7. The information handling system of claim 1, wherein the placeholder for the display of the secure content and the digital content are displayed within the same software application of the host display device.

8. A method of routing the display of secure content to a head mounted display device via a host information handling system comprising:
   capturing a three-dimensional image of a head-mounted display via a host three-dimensional camera co-located with a host video display;
   receiving an identification of a secure content;
   receiving an instruction to display digital content including the secure content via the host video display;
   disallowing the display of the secure content via the host video display;
   displaying via the host video display a placeholder for the display of the secure content and other digital content;
   determining, via the processor, a position and orientation of the head mounted display device with respect to the host video display based on the three-dimensional image;
   generating a primitive of the placeholder of the host display device from the perspective of the head mounted display based on the determined position and orientation of the head mounted display with respect to the host video display and a position of the placeholder with respect to the host video display; and rendering a three-dimensional image of the secure content such that the three-dimensional image of the secure content appears to be within the primitive of the placeholder.

9. The method of claim 8 comprising:
transmitting the rendered three-dimensional image of the secure content to a head mounted display device for display via the head mounted display.

10. The method of claim 8 comprising:
displaying a watermark via the display device; and
transmitting to the head mounted display device an indication of a location of the placeholder with respect to the watermark, for placement of the primitive of the placeholder within a three-dimensional primitive at the head mounted display device and display of the rendered three-dimensional image of the secure content.

11. The method of claim 10, wherein the location of the watermark displayed on the host display device matches the location of the placeholder displayed on the host display device.

12. The method of claim 8, wherein the secure content includes text information.

13. The method of claim 8, wherein the secure content includes a digital image.

14. The method of claim 8, wherein the placeholder for the display of the secure content and the digital content are not displayed within the same software application of the host display device.

15. An information handling system operating an augmented reality assisted display security system comprising:
a head mounted display;
a three-dimensional camera co-located with the head mounted display capturing a three-dimensional image of a host display device displaying a placeholder for the display of a secure digital content item and other digital content;
a processor executing code instructions of the augmented reality assisted display security system to:
receive a rendered three-dimensional image of a secure content item;
determine a position and orientation of the head mounted display with respect to the placeholder based on an identification of the plurality of physical boundaries of the host display within the three-dimensional image captured by the three-dimensional camera, and an identification of the position and orientation of the placeholder with respect to the plurality of physical boundaries of the host display received from the host display;
generate a three-dimensional primitive of the head mounted display and the placeholder of the host display device based on the determined position and orientation;
place the received rendered three-dimensional image of the secure content item within the three-dimensional primitive of the placeholder; and
the head mounted display displaying the three-dimensional image of the secure content according to the three-dimensional primitive such that the rendered three-dimensional image of the secure content appears to be within the placeholder.

16. The information handling system of claim 15, wherein the placeholder indicates a location within the host video display where the secure content item has been removed from display.

17. The information handling system of claim 16, wherein the placeholder indicates a location within the host video display where the secure content item has been covered such that the secure content item is not viewable via the host video display.

18. The information handling system of claim 15, wherein the secure content includes text information.

19. The information handling system of claim 15, wherein the secure digital content includes a digital image.

20. The information handling system of claim 15, wherein the placeholder for the display of the secure content and the digital content are displayed within the same software application of the host display device.

* * * * *